United States Patent
Olson et al.

(10) Patent No.: US 12,466,382 B2
(45) Date of Patent: Nov. 11, 2025

(54) SYSTEMS AND METHODS FOR A HYDRAULIC SYSTEM

(71) Applicant: Caterpillar Inc., Peoria, IL (US)

(72) Inventors: Andrew Olson, Vail, AZ (US); Dustin D. Denning, Chillicothe, IL (US); Christopher L. Wynkoop, Eureka, IL (US); Srikar Thaduvayi, Oro Valley, AZ (US); Karl P. Schneider, Decatur, IL (US)

(73) Assignee: Caterpillar Inc., Peoria, IL (US)

( * ) Notice: Subject to any disclaimer, the term of this patent is extended or adjusted under 35 U.S.C. 154(b) by 213 days.

(21) Appl. No.: 18/054,677

(22) Filed: Nov. 11, 2022

(65) Prior Publication Data

US 2024/0157809 A1    May 16, 2024

(51) Int. Cl.
| | |
|---|---|
| *B60W 10/30* | (2006.01) |
| *B60K 6/48* | (2007.10) |
| *B60L 1/00* | (2006.01) |
| *B60L 15/20* | (2006.01) |
| *B60L 50/16* | (2019.01) |
| *B60W 10/26* | (2006.01) |
| *B60W 20/00* | (2016.01) |
| *F15B 15/18* | (2006.01) |

(52) U.S. Cl.
CPC ............... *B60W 10/30* (2013.01); *B60K 6/48* (2013.01); *B60L 1/00* (2013.01); *B60L 1/003* (2013.01); *B60L 50/16* (2019.02); *B60W 10/26* (2013.01); *F15B 15/18* (2013.01); *B60L 15/20* (2013.01); *B60L 2200/40* (2013.01); *B60W 20/00* (2013.01); *B60Y 2200/14* (2013.01); *F15B 2211/20515* (2013.01); *Y02T 10/62* (2013.01); *Y02T 10/64* (2013.01); *Y02T 10/70* (2013.01); *Y10S 903/903* (2013.01); *Y10S 903/93* (2013.01)

(58) Field of Classification Search
CPC ............ F15B 2211/20515; F15B 15/18; Y02T 10/70; Y02T 10/64; Y02T 10/62; B60W 20/00; B60W 10/26; B60W 10/30; B60K 6/48; B60L 50/16; B60L 1/003; B60L 1/00; B60L 15/20; B60L 2200/40; Y10S 903/903; Y10S 903/93; B60Y 2200/14
See application file for complete search history.

(56) References Cited

U.S. PATENT DOCUMENTS

| | | | |
|---|---|---|---|
| 7,922,255 B2 | 4/2011 | Busley et al. | |
| 8,801,407 B2 * | 8/2014 | Simpson | F04B 49/002 417/429 |
| 10,655,297 B2 * | 5/2020 | Stener | E02F 9/2095 |
| 2022/0275800 A1 * | 9/2022 | Bauer | F04B 49/065 |

* cited by examiner

*Primary Examiner* — Peter J Bertheaud

(57) ABSTRACT

A method for controlling an electric motor driving a hydraulic pump for a battery-powered electric mobile machine includes receiving one or more command signals for one or more hydraulically-driven systems. The method also includes determining a minimum pump speed for each of the one or more hydraulically-driven systems, and determining a highest minimum pump speed for the one or more hydraulically-driven systems. The method further includes converting the highest minimum pump speed to an electric motor command, and sending the electric motor command to the electric motor.

20 Claims, 3 Drawing Sheets

SYSTEMS AND METHODS FOR A HYDRAULIC SYSTEM

TECHNICAL FIELD

The present disclosure relates generally to systems and methods for a hydraulic system for use in industrial equipment, and, more particularly, to systems and methods for a hydraulic system for use in an electric industrial vehicle or machine.

BACKGROUND

Electric or semi-electric vehicles or machines, for example, trucks (e.g., dump trucks, haul trucks, articulated dump trucks, etc.), utility vehicles for mining, load-haul-dump (LHD) vehicles, underground mining loaders, underground articulated trucks, wheel loaders, excavators, track-type tractors (i.e., bulldozers), graders, continuous miners, feeder breakers, roof bolters, etc., include one or more batteries. The one or more batteries power an electric motor, and the motor is configured to drive a plurality of hydraulic pumps (e.g., a plurality of hydraulic pumps arranged in a hydraulic pump stack) for a plurality of hydraulic systems. The hydraulic systems could include a hydraulic brake system, a hydraulic steering system, a hydraulic implement system, and one or more hydraulic fans. One hydraulic system may have a higher required motor speed or power demand than other hydraulic systems. Additionally, transitioning from one motor speed or power demand to another motor speed or power demand (e.g., to a higher motor speed or power demand or to a lower motor speed or power demand) may cause fluctuations or undulations in one or more hydraulic systems, may generate noise and/or vibrations from the motor, or otherwise negatively affect machine performance. Furthermore, drawing power from the one or more batteries while the machine is charging may slow the charging of the one or more batteries, which may necessitate longer machine downtime while charging.

U.S. Pat. No. 7,922,255, issued to Busley et al. on Apr. 14, 2011 ("the '255 patent"), describes a construction machine that includes an auxiliary drive, which may be powered by a hydraulic motor. The hydraulic motor of the '255 patent may include a control circuit, which may allow for various operations. However, the hydraulic motor of the '255 patent is not an electric motor, and does not operate at a maximum motor speed or power demand as required by one of a plurality of hydraulic systems. Furthermore, the systems of the '255 patent do not control a ramp up or a ramp down of the hydraulic motor, for example, depending on an operation status of the machine.

The systems and methods of the present disclosure may address or solve one or more of the problems set forth above and/or other problems in the art. The scope of the current disclosure, however, is defined by the attached claims, and not by the ability to solve any specific problem.

SUMMARY

This disclosure relates generally to the field of industrial vehicles or machines. More specifically the present disclosure relates to systems and methods for a hydraulic system for use with an industrial vehicle or machine, such as a battery-powered, electric or semi-electric vehicle or machine.

In some aspects, a method for controlling an electric motor driving a hydraulic pump for a battery-powered electric mobile machine may include receiving one or more command signals for one or more hydraulically-driven systems. The method also may include determining a minimum pump speed for each of the one or more hydraulically-driven systems, and determining a highest minimum pump speed for the one or more hydraulically-driven systems. The method further may include converting the highest minimum pump speed to an electric motor command, and sending the electric motor command to the electric motor.

In some other aspects, a control system for a battery-powered electric mobile machine may include an electric motor, a hydraulic pump driven by the electric motor, a plurality of hydraulically-driven systems driven by the hydraulic pump, and a controller. The controller may be configured to receive one or more command signals and determine a highest minimum pump speed for the plurality of hydraulically-driven systems. The controller may further be configured to determine and output a motor command for the electric motor based on the determined highest minimum pump speed.

In further aspects, a battery-powered electric mobile machine may include a battery, an electric motor powered by the battery, a hydraulic, pump driven by the electric motor, a plurality of hydraulically-driven systems, and a controller. The plurality of hydraulically-driven systems may include a hydraulic brake system, a hydraulic steering system, a hydraulic implement system, and hydraulic fans. The controller may be configured to receive one or more command signals, determine a highest minimum pump speed for the plurality of hydraulically-driven systems, convert the highest minimum pump speed to a motor speed, and output a motor command to ramp up or ramp down within predetermined ramping limits.

DETAILED DESCRIPTION

Both the foregoing general description and the following detailed description are exemplary and explanatory only and are not restrictive of the features, as claimed. As used herein, the terms "comprises," "comprising," "having," "including," or other variations thereof, are intended to cover a non-exclusive inclusion, such that a process, method, article, or apparatus that comprises a list of elements does not include only those elements, but may include other elements not expressly listed or inherent to such a process, method, article, or apparatus. Unless explicitly excluded, the use of the singular to describe a component, structure, or operation does not exclude the use of plural such components, structures, or operations or their equivalents. In addition, in this disclosure, relative terms, such as, for example, "about," "generally," "substantially," and "approximately" are used to indicate a possible variation of ±10% in the stated value.

Figure 1:
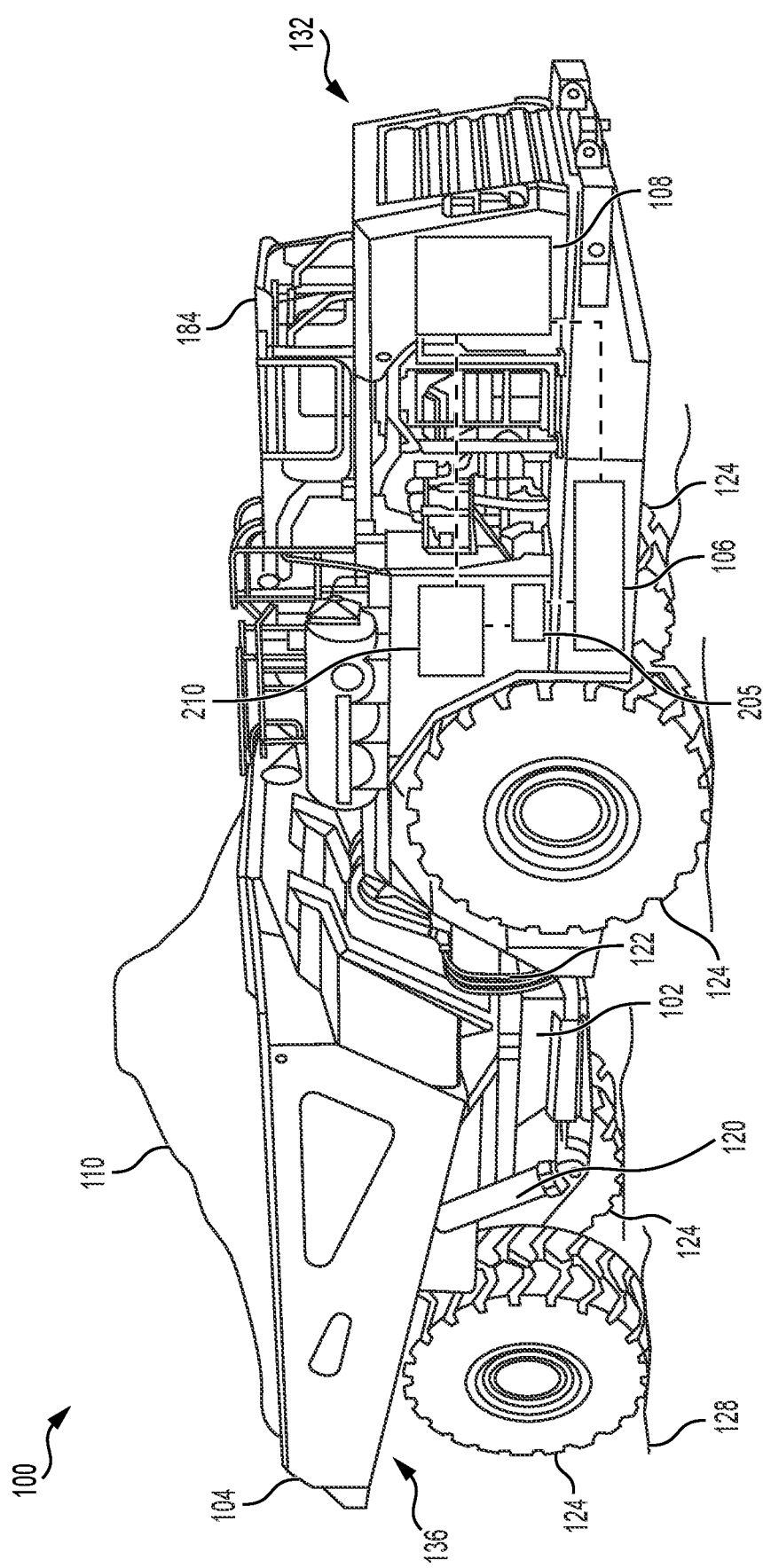
FIG. 1 is an illustration of an exemplary machine, including a control system, according to aspects of this disclosure.

FIG. 1 illustrates a mobile industrial machine 100, in which the systems and methods of the present disclosure may be used. Machine 100 may be a mobile machine with a frame 102 and an implement 104, for example, a dump bed. In these aspects, machine 100 may be a dump or haul truck, such as, for example, an articulated dump truck or an underground articulated dump truck. Machine 100 may be an all-electric machine driven only by electric power, or a partially electric hybrid machine that includes a selectively usable internal combustion engine along with an electric power source. Reference below will be made to an all-electric machine 100 driven by rechargeable battery power. However, it is understood that such an all-electric machine could also be driven solely or partially by one or more electric lines connected to a grid. Machine 100 may include a battery power supply including at least one battery 106. The machine 100 may also include one or more electric motors 108 powered by battery 106. Implement 104 may receive a payload 110 (e.g., ores, minerals, dirt, etc.), and may transfer payload 110 from one location to another. Implement 104 may be movable, for example, liftable and/or pivotable, in order to dump payload 110. The movement of implement 104 may be hydraulically controlled by one or more hydraulic pumps 210. Although hydraulic pump 210 is referred to as a singular element below, it is understood that hydraulic pump 210 may include a plurality of hydraulic pumps, and that a hydraulic pressure may be controlled by the plurality of hydraulic pumps, a plurality of valves, etc. As discussed in detail below, hydraulic pump 210 is driven or powered by a motor 108. One or more operational parameters of hydraulic pump 210 may be controlled by controller 205. Hydraulic pump 210 may be coupled to one or more hydraulic cylinders 120 via one or more hydraulic lines 122. Moreover, additional aspects of machine 100 may be controlled by hydraulic pump 210.

Machine 100 is shown as a dump or haul truck, but this disclosure is not so limited. Aspects of this disclosure may be implemented in other types of mobile industrial machines, such as, for example, load-haul-dump (LHD) machines, loaders, graders, excavators, track-type tractors (i.e., bulldozers), continuous miners, feeder breakers, roof bolters, utility vehicles for mining, etc. Specifically, aspects of this disclosure may be implemented in any battery-powered all-electric machine that includes one or more hydraulically-driven systems or devices. Accordingly, it may be understood that the aspects of the present disclosure are not limited to any particular machine type, and the reference to machine 100, which is depicted and suggested above as a dump or haul truck, is purely exemplary. Work-sites where machine 100 may be employed may include construction sites, mine sites, landfills, quarries, and the like, as well.

As mentioned, machine 100 includes frame 102, which may include a rigid structure. Furthermore, machine 100 includes a plurality of traction elements 124, which may be wheels, crawlers, or a combination thereof. Traction elements 124 may be supported on frame 102. A powering of traction elements 124 (e.g., via one or more electric motors, not shown) may cause frame 102 (and thus, machine 100) to move over a ground surface 128. If machine 100 were to include an articulated machine, such as an articulated dump truck, as noted above, frame 102 may include a split frame configuration with a forward sub-frame portion and a rearward sub-frame portion (not explicitly shown or annotated), with the forward sub-frame portion being pivotably coupled to the rearward sub-frame portion by way of a hitch.

One or more batteries 106 may be positioned in a bottom portion of machine 100. However, one or more batteries 106 may be positioned and/or coupled to any location of machine 100. In some aspects, one or more batteries 106 may be removable, for example, to be charged away from or separate from machine 100, to be replaced with one or more charged batteries 106, etc., which may help to extend the work time of machine 100, reduce the down time for charging, etc. Although not shown, machine 100 may include one or more charging connections. In these aspects, one or more charging cables may be coupled to machine 100 to charge battery 106.

Motor 108 may be an electric traction motor, and may be powered by one or more batteries 106. Motor 108 can be any type of appropriate electric motor, and may be sized to provide power, in the form of torque, to hydraulic pump 210. A gear reduction 212 may be located between motor 108 and hydraulic pump 210. In other aspects, motor 108 may be directly connected (e.g., without gear reduction) to hydraulic pump 210. Motor 108 may have motor capability limits, including torque and speed limits, defined by continuous curves, intermittent curves, and/or peak curves in one or more look-up tables corresponding to the particular electric motor.

Machine 100 may include a forward end 132 and a rearward end 136, as shown. In some aspects, machine 100 includes an operator cab 184, for example, toward forward end 132 of machine 100.

Figure 2:
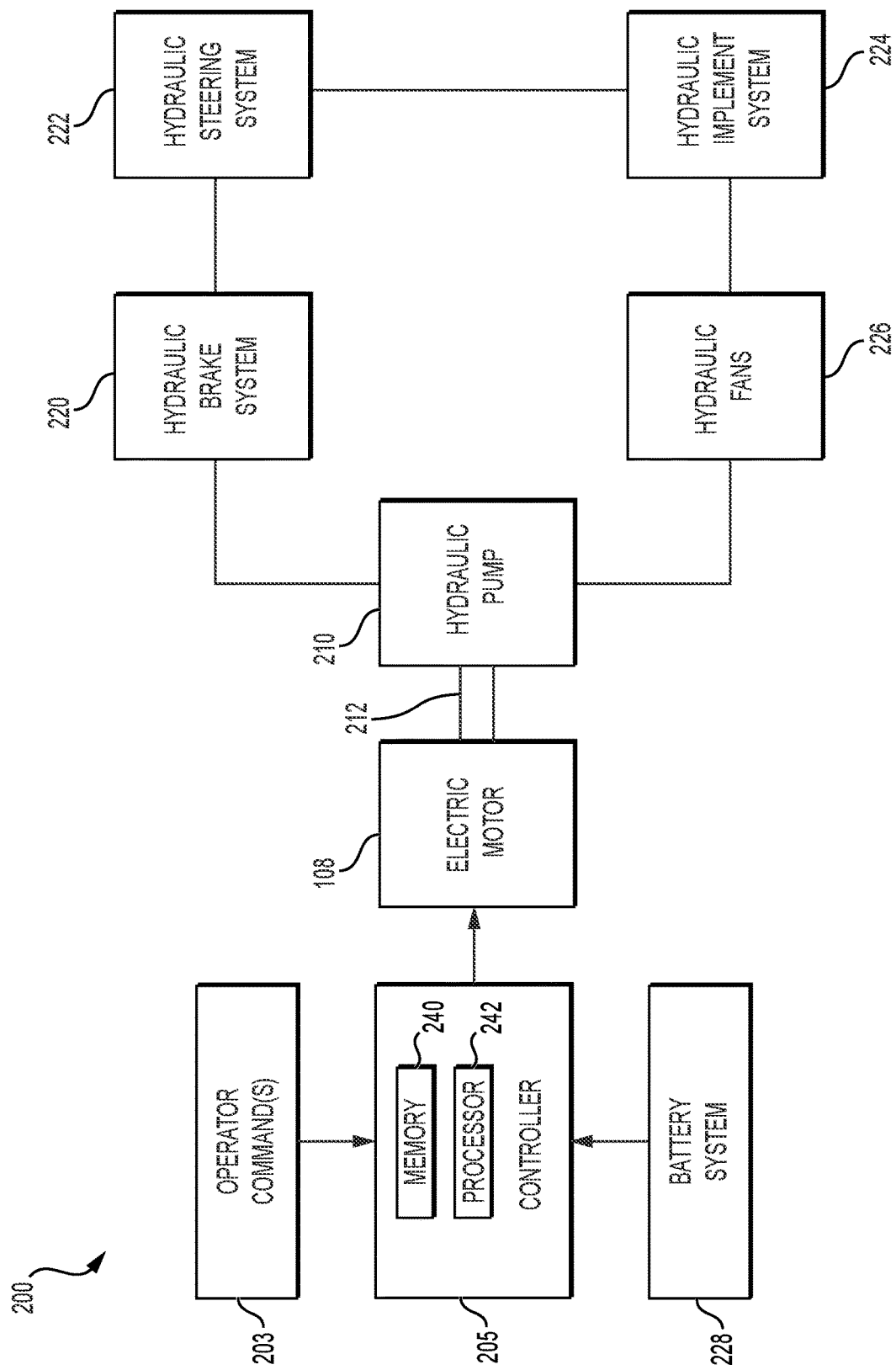
FIG. 2 is a schematic of an exemplary control system of the machine of FIG. 1, according to an exemplary embodiment.

As is known in the art and referring to FIGS. 1 and 2, machine 100 may include several additional parts, components, subsystems, or systems, for example, which may be hydraulically-driven. Machine 100 may include a control system 200. Machine 100 may also include one or more of a hydraulic brake system 220, a hydraulic steering system 222, a hydraulic implement system 224, and/or one or more hydraulic fans 226. Each of hydraulic brake system 220, hydraulic steering system 222, hydraulic implement system 224, and hydraulic fans 226 may include one or more sensors (not shown), which may be communicatively coupled to controller 205, for example, to help determine an operational status of a respective system and/or of machine 100. Each of hydraulic brake system 220, hydraulic steering system 222, hydraulic implement system 224, and hydraulic fans 226 may be connected to hydraulic pump 210, for example, via a hydraulic circuit and a plurality of valves to receive controlled hydraulic fluid pumped by hydraulic pump 210. As mentioned above, machine 100 includes hydraulic pump 210, and hydraulic pump 210 may include a plurality of hydraulic pumps, for example, arranged in a pump stack.

In some aspects, controller 205 may receive one or more operator commands and determine a minimum pump speed (e.g., of hydraulic pump 210) for one or more or all of hydraulic brake system 220, hydraulic steering system 222, hydraulic implement system 224, and hydraulic fans 226 for the one or more operator commands, for example, under various circumstances or operating parameters. Controller 205 may store minimum pump speeds for different operator commands under the various circumstances or operating parameters (e.g., via a memory 240). Controller 205 may determine the highest minimum pump speed of all of the minimum pump speeds (e.g., via a processor 242). The highest minimum pump speed will be a requested hydraulic pump speed value. In some aspects, for example, if there is a gear reduction between motor 108 and hydraulic pump 210, controller 205 may account for the gear reduction, for example, by multiplying the requested hydraulic pump speed value by a motor speed to pump speed gear reduction value, with the result being a requested motor speed value. Controller 205 may send the requested motor speed value to one or more components of machine 100, for example, to a controller or electronic control module for motor 108. In some aspects, the speed command may be negative.

As discussed below, the control of motor 108 and/or hydraulic pump 210 (e.g., by controller 205) may limit any changes to the requested motor speed by a motor speed ramp rate. In these aspects, the motor speed ramp rate may limit the increasing value when the requested speed is increasing, and the motor speed ramp rate may limit the decreasing value when the requested speed is decreasing. In some aspects, controller 205 may also apply a debounce before changing the requested motor speed. For example, controller 205 may use a debounce time (e.g., a motor speed debounce time) when the requested motor speed is increasing or decreasing. Alternatively, controller 205 may only apply a debounce (e.g., a motor speed debounce time of approximately 3 seconds) when the requested motor speed is decreasing, and not when the requested motor speed is increasing.

Additionally, as shown in FIG. 2, machine 100 may include a battery system 228, which may include one or more sensors communicatively coupled to controller 205. In this aspects, the one or more sensors of battery system 228 may detect one or more operational parameters or statuses of battery 106, for example, including a charging status.

As shown in FIG. 2, controller 205 may receive one or more operator commands 203. The one or more operator commands 203 may signal machine 100 to engage or activate one or more of hydraulic brake system 220, hydraulic steering system 222, hydraulic implement system 224, and/or hydraulic fans 226.

Controller 205 may be in communication (e.g., wired or wireless communication) with one or more features or portions of machine 100. For example, controller 205 may be in communication with one or more user interfaces (e.g., joysticks, steering wheels, etc.), control units, displays (e.g., touch screens), etc. on machine 100 (e.g., within operator cab 184) or remote from machine 100, through or via which controller 205 may receive operator commands 203. Controller 205 may receive inputs and send outputs, for example, in order to operate machine 100, including controlling a speed of motor 108 and/or a rate change of the speed of motor 108 (e.g., the ramping up rate and/or the ramping down rate).

Controller 205 may be a separate controller on machine 100, or may be integrated into a central vehicle controller (e.g., a main power or operation controller, etc.). Alternatively, controller 205 may be integrated into one or more of hydraulic pump 210, a battery control module, a motor control module, or another dedicated control module on machine 100.

As shown in FIG. 2, controller 205 may include at least one memory 240 and at least one processor 242. Controller 205 may embody a single microprocessor or multiple microprocessors that may include systems for performing any of the operations mentioned herein. For example, controller 205 may include memory 240, a secondary storage device, processor 242, such as a central processing unit or any other systems for accomplishing a task consistent with the present disclosure. Memory 240 or secondary storage device associated with controller 205 may be non-transitory computer-readable media that store data and/or software routines that may assist controller 205 in performing its functions, such as the functions of method or process 300 of FIG. 3, as discussed below. Memory 240 may store data and/or software routines that may assist controller 205 in performing its functions, such as the functions of method 300 in FIG. 3. Further, memory 240 or secondary storage device associated with controller 205 may also store data received from the various inputs or sensors associated with machine 100. In these aspects, controller 205 may process one or more inputs and output one or more control signals, for example, to motor 108.

Numerous commercially available microprocessors can be configured to perform the functions of controller 205. It should be appreciated that controller 205 could readily embody a general machine controller capable of controlling numerous other machine functions. Alternatively, a special-purpose machine controller could be provided. Various other known circuits may be associated with controller 205, including signal-conditioning circuitry, communication circuitry, hydraulic or other actuation circuitry, and other appropriate circuitry. As discussed herein, controller 205 may receive various inputs (e.g., from various sensors or systems). Based on the various inputs, controller 205 may signal motor 108 to operate at a specified motor speed and/or to change the motor speed at a certain rate of change (e.g., ramp up or ramp down).

As mentioned, controller 205 may store required pump speeds for hydraulic pump 210 for respective operator commands 203 for the various hydraulically-driven systems (220, 222, 224, 226). Furthermore, controller 205 may determine the highest minimum pump speed for the various hydraulically-driven systems based on operator commands 203. Controller 205 may correlate the highest minimum pump speed to a motor speed of motor 108 and otherwise process the signal(s) to be output to motor 108. As shown in FIG. 2, controller 205 may provide one or more signals to motor 108. For example, the one or more signals to motor 108 may include a signal to ramp up or a signal to ramp down motor 108, for example, in order for motor 108 to drive hydraulic pump 210 to the determined highest minimum pump speed.

As mentioned and shown in FIG. 2, motor 108 drives hydraulic pump 210. The connection may be via a gear reduction (e.g., gear reduction 212), or the connection may be direct. Additionally, hydraulic pump 210 pressurizes hydraulic fluid for the plurality of hydraulically-driven systems on machine 100. For example, the plurality of hydraulically-driven systems on machine 100 may include hydraulic brake system 220, hydraulic steering system 222, hydraulic implement system 224, and hydraulic fans 226.

As mentioned, controller 205 may receive one or more operator commands concerning one or more of hydraulic brake system 220, hydraulic steering system 222, hydraulic implement system 224, and hydraulic fans 226. The one or more operator commands may each include a minimum pump speed, which controller 205 may correlate to a required motor speed, as discussed above. Moreover, the minimum pump speed for hydraulic brake system 220, hydraulic steering system 222, hydraulic implement system 224, and hydraulic fans 226 may vary. Specifically, the minimum pump speed of hydraulic brake system 220 may vary between a low minimum pump speed (e.g., zero) when machine 100 is not braking (e.g., traveling at a constant speed and/or stopped, for example, with a parking brake engaged), and a high minimum pump speed when machine 100 is braking. Additionally, the minimum pump speed of brake system 220 may be even higher when machine 100 is braking at a high rate (e.g., quickly slowing down from a high speed).

Similarly, the minimum pump speed of each of hydraulic steering system 222, hydraulic implement system 224, and/or hydraulic fans 226 may vary during various states of operation of machine 100. For example, hydraulic steering system 222 may have a higher minimum pump speed when machine 100 is turning, compared to when machine 100 is traveling straight. Hydraulic implement system 224 may have a higher minimum pump speed when machine 100 is moving (e.g., raising or lowering) implement 104, compared to when implement system 224 is stationary. Additionally, hydraulic implement system 224 may have a higher minimum pump speed when machine 100 is moving implement 104 that is under or carrying a heavier load (e.g., payload 110), compared to when machine 100 is moving implement 104 that is under or carrying a lighter load. Furthermore, hydraulic fans 226 may have a higher minimum pump speed when one or more hydraulically-driven fans are operated at a higher speed, compared to when the one or more hydraulically-driven fans are operating at a lower speed or are off.

As mentioned, controller 205 may receive signals or retrieve information (e.g., from memory 240) indicative of a required or minimum pump speed from each of hydraulic brake system 220, hydraulic steering system 222, hydraulic implement system 224, and hydraulic fans 226. Controller 205 (e.g., via memory 240 and/or processor 242) may determine the highest minimum pump speed. Controller 205 (e.g., via memory 240 and/or processor 242) may process the highest minimum pump speed to determine a corresponding motor speed, as discussed above. Then controller 205 outputs a signal to motor 108 to operate at a requisite motor speed, such that hydraulic pump 210 is driven at least at the highest minimum pump speed. Stated another way, if the minimum pump speed for hydraulic fans 226 is higher than the minimum pump speed for hydraulic steering system 222 (and higher than the minimum pump speed of the other systems that rely on hydraulic pump 210), controller 205 will output a signal to motor 108 to operate at the required motor speed such that hydraulic pump 210 is driven at least at the minimum pump speed for hydraulic fans 226.

Moreover, as mentioned, controller 205 may receive signals from battery system 228 indicative of a status of battery system 228. The status of battery system 228 may affect the operation of machine 100, for example, the motor speed signal provided to motor 108. In some aspects, if battery system 228 is in a charging state, controller 205 may signal motor 108 to operate at a lower motor speed, for example, lower than a motor speed that correlates to the highest minimum pump speed of the hydraulically-driven systems. The lower motor speed may help to allow for battery system 228 (e.g., battery 106) to charge more quickly. The lower motor speed may also help to reduce the noise generated by motor 108, for example, as machine 100 is likely stationary and/or in an enclosed environment with one or more operators in close proximity while battery system 228 is charging.

In some aspects, as mentioned above, controller 205 may also control the rate of change (i.e., ramp up or ramp down rate) of motor 108, and thus also of hydraulic pump 210. For example, if the highest minimum pump speed of one or more hydraulically-driven systems changes (e.g., increases or decreases), controller 205 may signal motor 108 to change the motor speed (e.g., increase or decrease) within a predetermined range (e.g., with a ramp up limit and a ramp down limit). In these aspects, the predetermined range may include a maximum ramp up signal and/or a maximum ramp down signal. For example, hydraulic pump 210 may include a ramp rate range between approximately 50 rpm/second and approximately 500 rpm/second. Additionally, the ramp rate range for motor 108 may depend on whether motor 108 and hydraulic pump 210 are coupled via gear reduction 212 or are directly coupled. If motor 108 and hydraulic pump 210 are coupled via gear reduction 212, then the ramp rate range for motor 108 may be in a range such that the conversion (e.g., via gear reduction 212) assures that the ramp rate range for hydraulic pump 210 is between approximately 50 rpm/second and approximately 500 rpm/second. The maximum rate of change may depend on the type and/or size of machine 100, motor 108, hydraulic pump 210, etc. Additionally, in some aspects, the maximum rate of change may depend on the operating status (e.g., whether machine 100 is moving, machine 100 is stationary, machine 100 is charging, etc.) Moreover, motor 108 may include a maximum operational motor speed and/or a minimum operation motor speed, which may serve as an overall operating range for motor 108. Similarly, hydraulic pump 210 may include a maximum operational pump speed and/or a minimum operation pump speed, which may serve as an overall operating range for hydraulic pump 210.

INDUSTRIAL APPLICABILITY

The systems and methods of the present disclosure find applicability in electric machines 100 having electric motor 108 and hydraulic pump 210. In particular, the present disclosure finds applicability in the control of electric motor 108 that drives hydraulic pump 210 to provide pressurized hydraulic fluid to a plurality of hydraulically-driven systems that have differing requirements. The systems and methods of the present disclosure may also help to reduce overall noise from motor 108 and/or hydraulic pump 210, help prevent damage to motor 108, hydraulic pump 210, and/or other portions or components of machine 100, and/or help to effectively and/or efficiently charge battery 106 or otherwise operate machine 100.

Figure 3:
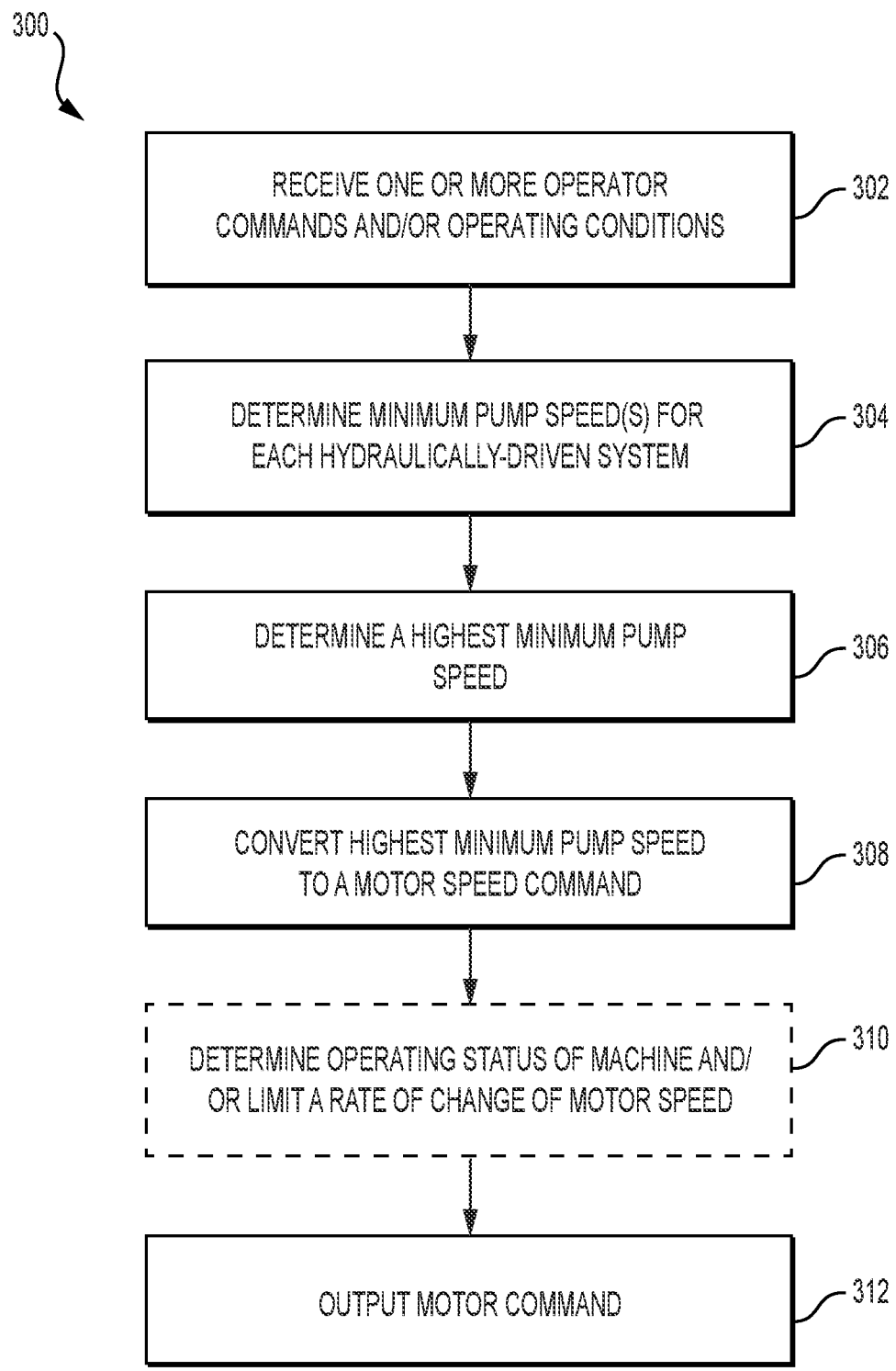
FIG. 3 is a flowchart depicting an exemplary method for operating one or more portions of the control system, according to aspects of this disclosure.

FIG. 3 is a flowchart showing a method 300 for controlling electric motor 108 and hydraulic pump 210, which is in communication with a plurality of hydraulically-drive systems, in a battery-powered, electric machine 100. Various aspects of method 300 may be performed by controller 205. Method 300 includes an initial step 302, in which controller 205 receives one or more operator commands and/or operating conditions. As discussed above, the one or more operator commands may include one or more commands for one or more hydraulically-driven systems (e.g., hydraulic brake system 220, hydraulic steering system 222, hydraulic implement system 224, and/or hydraulic fans 226). Step 302 may include receiving one or more operating conditions or other software triggers that controller 205 is programmed to determine, for example, one or more of the current charge level of battery 106, the current speed of motor 108, the current speed of hydraulic pump 210, the current status of one or more of hydraulic brake system 220, hydraulic steering system 222, hydraulic implement system 224, hydraulic fans 226, and/or one or more operating conditions for machine 100. As discussed herein, "receiving command signals" is understood to include receiving one or more operator commands and/or operating conditions, including software triggers that controller 205 is programmed to determine.

Next, in a step 304, controller 205 determines minimum pump speeds (e.g., for hydraulic pump 210) for each of the hydraulically-driven systems. The minimum pump speeds for each of the hydraulically-driven systems may be based on the received operator commands, one or more system controls, and/or various sensed values or conditions of the hydraulically-driven system or other components or aspects of machine 100. Furthermore, as mentioned above, controller 205 may store minimum pump speeds for each of the hydraulically-driven systems relative to respective operator commands, system controls, sensed values or conditions, etc. For example, step 304 may include controller 205 determining minimum pump speeds for each of hydraulic brake system 220, hydraulic steering system 222, hydraulic implement system 224, and hydraulic fans 226. In other aspects, one or more of hydraulic brake system 220, hydraulic steering system 222, hydraulic implement system 224, and hydraulic fans 226 may be inactive (e.g., not subject to the one or more operator commands). For example, hydraulic brake system 220 may be inactive when machine 100 is not braking. Hydraulic steering system 222 may be inactive when machine 100 is not steering (e.g., not changing direction). Hydraulic implement system 224 may be inactive when implement 104 is not being manipulated (e.g., not lifted, lowered, angled, etc.). Hydraulic fans 226 may be inactive when machine (e.g., battery 106, motor 108, a radiator fan, a blower fan for a drivetrain, etc.) does not require one or more fans being active. Additionally, as discussed above, the minimum pump speed of each of hydraulic brake system 220, hydraulic steering system 222, hydraulic implement system 224, and hydraulic fans 226 may vary, for example, when each system is engaged or activated to different levels, degrees, intensities, etc. As such, controller 205 determines minimum pump speeds for each system in step 304.

Next, in a step 306, controller 205 determines a highest minimum pump speed. For example, controller 205 compares the minimum pump speed for each of the hydraulically-driven systems (e.g., hydraulic brake system 220, hydraulic steering system 222, hydraulic implement system 224, and hydraulic fans 226), and selects the highest minimum pump speed.

In a step 308, controller 205 converts the highest minimum pump speed to a minimum motor speed, and a corresponding motor command. As discussed above, hydraulic pump 210 is driven by electric motor 108. If there is a gear reduction between electric motor 108 and hydraulic pump 210, step 308 includes converting the highest minimum pump speed to a minimum motor speed and a corresponding motor command.

Next, in an optional step 310, controller 205 may limit the corresponding motor command based on one or more factors. Specifically, optional step 310 may include determining an operating status of the machine and/or limiting a rate of change (e.g., a ramp up or ramp down rate) of motor speed and/or the pump speed. For example, step 310 may include controller 205 receiving one or more signals from battery system 228, for example, indicative of a charging status of battery 106. If battery 106 is charging, controller 205 may account for the charging status, for example, by reducing the highest minimum pump speed, by setting a maximum speed at which hydraulic pump 210 may operate, by setting a maximum speed at which motor 108 may operate, or otherwise account for the charging status.

Additionally, in some aspects, the operating status of machine 100 may include controller 205 receiving information concerning one or more operational tasks being performed (or to be performed) by machine 100. For example, the operating status of machine 100 may include a dumping operation, a digging operation, a loading operation, a trimming operation, or other operational task. Based on the operating status or operational task, controller 205 may signal motor 108 to operate at a specific motor speed or range of motor speeds to help ensure proper operation of machine 100 in the operating status or operational task. Moreover, as discussed above, optional step 310 may include limiting the rate of change of the speed of motor 108. For example, if the desired motor speed is different from a current motor speed, then controller 205 may adjust the motor speed command such that motor 108 is commanded to incrementally ramp up or ramp down, for example, to the motor speed that corresponds to the highest minimum pump speed, for example, within a predetermined ramping range. For example, controller 205 may adjust the motor command in order to signal motor 108 to increase or decrease the motor speed by a predetermined maximum value. As such, if the difference between the current motor speed and the desired motor speed exceeds the predetermined maximum motor speed change, step 310 may include controller 205 signaling motor 108 to ramp up or ramp down (e.g., by the predetermined maximum pump speed change) a number of times, for example, over a period of time. As such, step 310 may include gradually or incrementally transitioning motor 108 to the desired motor speed, such that hydraulic pump 210 is eventually driven at the highest minimum pump speed.

Lastly, method 300 includes a step 312 of outputting the motor command. In this step, controller 205 may output the motor command to motor 108. As discussed above, the motor command may be a plurality of commands (e.g., temporally spaced apart) to gradually ramp up or ramp down motor 108, such that hydraulic pump 210 is gradually driven at the highest minimum pump speed. Moreover, in some aspects, controller 205 may apply a debounce before changing the desired motor speed and outputting the corresponding motor command (i.e., either to increase or decrease the speed of motor 108). For example, controller 205 may include debounce time of approximately 3 seconds. Additionally, in some aspects, controller 205 may only apply a debounce before outputting a motor command to decrease motor speed, and may not apply a debounce before outputting a motor command to increase motor speed.

The steps of method 300 may be performed in response to one or more operator commands, either instantly or with an applied debounce. Alternatively or additionally, the steps of method 300 may be performed in response to one or more changes in operating status, for example, a change in an operational task and/or a change in a charging status of battery 106.

In these aspects, control system 200, including controller 205, may help to ensure that motor 108 is operating at a motor speed to drive hydraulic pump 210, such that hydraulic pump 210 can sufficiently drive the one or more hydraulically-driven systems of machine 100 (e.g., the hydraulically-driven system that has the highest minimum pump speed). Additionally, controller 205 may help to ensure that motor 108 and/or hydraulic pump 210 are not operating at too high of a motor or pump speed, which may help machine 100 (e.g., battery 106, motor 108, etc.) to operate efficiently. Furthermore, in some aspects, based on the operating status of machine 100 (e.g., as determined in optional step 310), controller 205 may signal motor 108 to ramp up or ramp down at one or more various predetermined rates. For example, as discussed above, the ramp up or ramp down rate may be limited. In these aspects, control system 200, including controller 205, may help to reduce noise generated by motor 108 and/or hydraulic pump 210, may help to reduce current ripple (e.g., on battery system 228 and battery 106), may help to reduce vibrations or undulations on machine 100 (e.g., on hydraulic pump 210), may help to prevent damage to motor 108 and/or hydraulic pump 210 or other components (e.g., the hydraulically-driven systems) of machine 100, etc.

It will be apparent to those skilled in the art that various modifications and variations can be made to the disclosed systems and methods for a hydraulic system without departing from the scope of the disclosure. Other embodiments of the systems and methods for a hydraulic system will be apparent to those skilled in the art from consideration of the specification and the accompanying figures. It is intended that the specification, and, in particular, the examples provided herein be considered as exemplary only, with a true scope of the disclosure being indicated by the following claims and their equivalents.

What is claimed is:

1. A method for controlling an electric motor driving a hydraulic pump for a battery-powered electric mobile machine, the method comprising:
receiving one or more command signals for a plurality of hydraulically-driven systems;
determining a minimum pump speed for each of the plurality of hydraulically-driven systems required to operate the hydraulically-driven system;
determining a highest minimum pump speed of the minimum pump speeds for the plurality of hydraulically-driven systems;
converting the highest minimum pump speed to an electric motor command; and
sending the electric motor command to the electric motor.

2. The method of claim 1, further comprising a step of limiting the electric motor command based on a ramping rate.

3. The method of claim 2, further comprising a step of determining an operating status of the machine, wherein the ramping rate is a first ramping rate if the machine is in a first operating status, and wherein the ramping rate is a second ramping rate different from the first ramping rate if the machine is in a second operating status.

4. The method of claim 1, wherein the step of determining a minimum pump speed for each of the plurality of hydraulically-driven systems includes comparing the command signals to stored values of pump speeds for each of the plurality of hydraulically-driven systems under various conditions.

5. The method of claim 1, wherein the step of determining a highest minimum pump speed is performed in response to a change of an operating status of the battery-powered electric machine.

6. The method of claim 1, wherein the hydraulic pump includes a plurality of hydraulic pumps arranged in a hydraulic pump stack.

7. The method of claim 1, wherein the plurality of hydraulically-driven systems includes a hydraulic brake system, a hydraulic steering system, a hydraulic implement system, and hydraulic fans.

8. The method of claim 1, wherein the battery-powered electric mobile machine is a haul truck.

9. A control system for a battery-powered electric mobile machine, comprising:
an electric motor;
a hydraulic pump driven by the electric motor;
a plurality of hydraulically-driven systems driven by the hydraulic pump, wherein each hydraulically-driven system has a minimum pump speed required to operate the hydraulically-driven system; and
a controller, wherein the controller is configured to receive one or more command signals, and wherein the controller is configured to determine a highest minimum pump speed of the minimum pump speeds for the plurality of hydraulically-driven systems, and
wherein the controller is further configured to determine and output a motor command for the electric motor based on the determined highest minimum pump speed.

10. The control system of claim 9, wherein the hydraulic pump is coupled to the electric motor via a gear reduction.

11. The control system of claim 9, wherein the controller is configured to adjust the motor command at a ramping rate.

12. The control system of claim 11, wherein the controller is configured to determine an operating status of the battery-powered electric mobile machine, wherein if the machine is in a first operating status, the ramping rate is a first ramping rate, and if the machine is in a second operating status, the ramping rate is a second ramping rate different from the first ramping rate.

13. The control system of claim 9, wherein the controller is configured to determine the highest minimum pump speed in response to one or more operator commands for the plurality of hydraulically-driven systems.

14. The control system of claim 9, wherein the controller includes a memory storing a minimum pump speed for each of the plurality of hydraulically-driven systems under various conditions and in response to various operator commands.

15. The control system of claim 9, wherein the hydraulic pump includes a plurality of hydraulic pumps arranged in a pump stack.

16. The control system of claim 14, wherein the plurality of hydraulically-driven systems includes a hydraulic brake system, a hydraulic steering system, a hydraulic implement system, and hydraulic fans.

17. The control system of claim 9, wherein the battery-powered electric mobile machine is a haul truck.

18. A battery-powered electric mobile machine, comprising:
a battery;
an electric motor powered by the battery;
a hydraulic pump driven by the electric motor;
a plurality of hydraulically-driven systems, wherein the plurality of hydraulically-driven systems includes a hydraulic brake system, a hydraulic steering system, a hydraulic implement system, and hydraulic fans, wherein each hydraulically-driven system has a minimum pump speed required to operate the hydraulically-driven system; and
a controller, wherein the controller is configured to receive one or more command signals, determine a highest minimum pump speed of the minimum pump speeds for the plurality of hydraulically-driven systems, convert the highest minimum pump speed to a motor speed, and output a motor command to ramp up or ramp down within predetermined ramping limits.

19. The battery-powered electric mobile machine of claim 18, wherein the controller is configured to determine whether the battery is charging, wherein if the machine is charging, the predetermined ramping limits are first predetermined ramping limits, and if the machine is not charging, the predetermined ramping limits are second predetermined ramping limits different from the first predetermined ramping limits.

20. The battery-powered electric mobile machine of claim 18, wherein the battery-powered electric mobile machine is a haul truck including a frame and a dump bed.

* * * * *